(12) United States Patent
Wiseman (10) Patent No.: US 12,434,682 B1
(45) Date of Patent: Oct. 7, 2025

(54) HOVER DRONE SYSTEM

(71) Applicant: Owen Richard Wiseman, Cape Coral, FL (US)

(72) Inventor: Owen Richard Wiseman, Cape Coral, FL (US)

( * ) Notice: Subject to any disclaimer, the term of this patent is extended or adjusted under 35 U.S.C. 154(b) by 0 days.

(21) Appl. No.: 17/961,322

(22) Filed: Oct. 6, 2022

Related U.S. Application Data (63) Continuation-in-part of application No. 16/696,024, filed on Nov. 26, 2019, now abandoned.

(51) Int. Cl.
  *B60V 1/11* (2006.01)
  *B60V 1/04* (2006.01)
  *B60V 3/00* (2006.01)

(52) U.S. Cl.
  CPC ............... *B60V 1/11* (2013.01); *B60V 1/043* (2013.01); *B60V 3/00* (2013.01)

(58) Field of Classification Search
  CPC .. B60V 1/11; B60V 1/043; B60V 3/00; B64U 30/20
  See application file for complete search history.

(56) References Cited

U.S. PATENT DOCUMENTS

| | | | | |
|---|---|---|---|---|
| 3,241,627 A * | 3/1966 | Hart | ......................... | B60V 1/06 180/122 |
| 3,730,298 A * | 5/1973 | Schouw | ................. | B60V 1/043 180/126 |
| 3,763,957 A * | 10/1973 | Hunt | ...................... | B60V 1/115 301/5.1 |
| 5,267,626 A * | 12/1993 | Tanfield, Jr. | ............. | B60V 1/08 180/117 |
| 5,727,495 A * | 3/1998 | Reslein | ..................... | B63B 1/12 440/37 |
| 6,164,591 A * | 12/2000 | Descatha | .................. | B64C 3/50 244/50 |
| 6,843,447 B2 * | 1/2005 | Morgan | .................... | B64C 5/02 244/12.3 |
| 7,398,740 B2 * | 7/2008 | Boncodin | ................ | B60V 1/04 114/77 R |
| 8,016,226 B1 * | 9/2011 | Wood | .................. | B64C 29/0033 244/23 B |
| 8,496,200 B2 * | 7/2013 | Yoeli | .................... | B64C 29/0025 244/23 B |
| 8,596,570 B1 * | 12/2013 | Carambat | ............... | B64C 11/20 244/12.1 |
| 8,876,038 B2 * | 11/2014 | Yoeli | ....................... | B64C 27/20 244/23 A |
| 9,457,901 B2 * | 10/2016 | Bertrand | ................. | A63H 27/12 |
| 9,868,431 B1 * | 1/2018 | Ladislao | ................. | B64U 10/70 |
| 9,975,633 B1 * | 5/2018 | Johnson | ................ | B64C 11/001 |
| 10,160,435 B2 * | 12/2018 | Feng | ........................ | B60V 1/14 |

(Continued)

*Primary Examiner* — Medhat Badawi
(74) *Attorney, Agent, or Firm* — Richard Eldredge; Leavitt Eldredge Law Firm (57) ABSTRACT

A hover drone system includes a hull extending from a front end to a rear end and from a first side to a second side; ducted fans integrated into the hull, the ducted fans provide lift and propulsion for the hover drone system, the fans operated by a power source; a first sidewall extending from the first side of the hull; a second sidewall extending from the second side of the hull; and a flexible skirt extending from the front end of the hull and from the first sidewall to the second sidewall; the rear end of the hull is open.

1 Claim, 13 Drawing Sheets

(56) References Cited

U.S. PATENT DOCUMENTS

| | | | | |
|---|---|---|---|---|
| 10,246,184 B2* | 4/2019 | Ragland | | B64C 29/0025 |
| 2001/0040062 A1* | 11/2001 | Illingworth | | B64C 11/001 |
| | | | | 416/185 |
| 2001/0048052 A1* | 12/2001 | Illingworth | | F15D 1/00 |
| | | | | 244/199.1 |
| 2002/0047071 A1* | 4/2002 | Illingworth | | F15D 1/00 |
| | | | | 244/199.1 |
| 2004/0050602 A1* | 3/2004 | Jones | | B60V 1/04 |
| | | | | 180/116 |
| 2004/0155143 A1* | 8/2004 | Yoeli | | B60V 1/06 |
| | | | | 244/17.11 |
| 2006/0113426 A1* | 6/2006 | Yoeli | | B64C 27/20 |
| | | | | 244/23 A |
| 2006/0162638 A1* | 7/2006 | Boncodin | | B60V 1/08 |
| | | | | 114/272 |
| 2007/0017722 A1* | 1/2007 | St. Louis | | B60V 1/04 |
| | | | | 180/116 |
| 2007/0034734 A1* | 2/2007 | Yoeli | | B64C 27/20 |
| | | | | 244/12.1 |
| 2007/0034739 A1* | 2/2007 | Yoeli | | B64D 17/80 |
| | | | | 244/23 R |
| 2008/0054121 A1* | 3/2008 | Yoeli | | B64C 27/08 |
| | | | | 244/12.1 |
| 2008/0283673 A1* | 11/2008 | Yoeli | | B64C 29/0033 |
| | | | | 244/23 A |
| 2009/0101426 A1* | 4/2009 | Vonli | | B60V 1/043 |
| | | | | 180/116 |
| 2010/0001128 A1* | 1/2010 | Morehead | | B60V 3/08 |
| | | | | 244/100 A |
| 2010/0270419 A1* | 10/2010 | Yoeli | | B64C 27/20 |
| | | | | 244/209 |
| 2012/0091257 A1* | 4/2012 | Wolff | | B64U 10/20 |
| | | | | 244/12.4 |
| 2016/0200415 A1* | 7/2016 | Cooper | | B64C 39/001 |
| | | | | 244/17.15 |
| 2016/0229530 A1* | 8/2016 | Welsh | | B64U 30/12 |
| 2016/0325834 A1* | 11/2016 | Foster | | B64C 39/024 |
| 2016/0340021 A1* | 11/2016 | Zhang | | B64C 27/08 |
| 2016/0362173 A1* | 12/2016 | Marion | | B64C 39/024 |
| 2016/0378108 A1* | 12/2016 | Paczan | | B64U 20/00 |
| | | | | 705/330 |
| 2017/0057630 A1* | 3/2017 | Schwaiger | | B64C 27/026 |
| 2017/0166309 A1* | 6/2017 | Sekiya | | B64D 17/00 |
| 2017/0197719 A1* | 7/2017 | Kwon | | B64F 1/12 |
| 2017/0225782 A1* | 8/2017 | Kohstall | | B64U 30/293 |
| 2017/0297550 A1* | 10/2017 | Feng | | B60V 1/043 |
| 2017/0297703 A1* | 10/2017 | Thelen | | B64C 30/29 |
| 2017/0316283 A1* | 11/2017 | Fryshman | | A01H 1/027 |
| 2017/0316701 A1* | 11/2017 | Gil | | B64U 10/16 |
| 2017/0341776 A1* | 11/2017 | McClure | | B64U 10/16 |
| 2018/0319496 A1* | 11/2018 | Zhang | | B64C 27/08 |
| 2019/0019066 A1* | 1/2019 | Fryshman | | A01M 1/06 |
| 2019/0152569 A1* | 5/2019 | Vandenworm | | B63B 22/021 |
| 2019/0180151 A1* | 6/2019 | Fryshman | | G06F 18/214 |
| 2020/0144828 A1* | 5/2020 | Gu | | H02J 7/00034 |
| 2020/0283136 A1* | 9/2020 | Nguyen | | H04L 9/50 |
| 2020/0298815 A1* | 9/2020 | Dei Castelli | | B60V 1/16 |
| 2020/0302243 A1* | 9/2020 | Fryshman | | A01M 1/026 |
| 2021/0053672 A1* | 2/2021 | Villabrille Prades | | |
| | | | | B64C 11/007 |
| 2021/0053694 A1* | 2/2021 | Winkelstein | | B64C 29/0025 |
| 2021/0216085 A1* | 7/2021 | Wake | | G05D 1/102 |
| 2021/0316859 A1* | 10/2021 | Qiu | | B64D 27/24 |
| 2021/0323691 A1* | 10/2021 | Foster | | B64D 27/24 |
| 2021/0380186 A1* | 12/2021 | Zhu | | B62D 57/024 |
| 2021/0394915 A1* | 12/2021 | Carlson | | B64D 31/00 |
| 2021/0394933 A1* | 12/2021 | Kwon | | B64F 5/60 |
| 2021/0403155 A1* | 12/2021 | Neiser | | B64C 29/0033 |
| 2022/0001976 A1* | 1/2022 | Iñaki | | B64U 10/14 |
| 2022/0034332 A1* | 2/2022 | Ishitsuka | | F04D 19/00 |
| 2022/0048617 A1* | 2/2022 | Shima | | B64C 5/02 |
| 2022/0081107 A1* | 3/2022 | Merdinger | | B64D 27/24 |

* cited by examiner

HOVER DRONE SYSTEM

BACKGROUND

1. Field of the Invention

The present invention relates generally to hovercraft and drone systems, and more specifically, to a hover drone system for combining beneficial aspects of both hovercraft and drone systems for efficient vehicle travel over water.

2. Description of Related Art

Hovercraft and drone systems are well known in the art but have various limitation. For example, some hovercraft systems have flexible rubber front and rear skirts allowing lift fans to force air underneath lifting the central hull out of the water thus reducing drag. However, these hovercraft systems cannot operate out of water.

Other hovercraft systems are completely skirted on all sides with air bourn propellers that allow the hovercraft to operate on both land and water. However, these hovercrafts are limited in object clearance height by the skirt depth and its stability. Also, these hovercrafts are limited in their slope climbing ability (generally about 10-20% gradient) and are tricky to maneuver in tight spaces.

Conventional drone systems can maintain stable hover and flight with electronic flight management systems and can fly under manual or remote control. Most are battery powered. However, these drone systems are limited in payload capacity and/or flight duration due in large part to power requirements just to hover. Also, these drone systems are not designed to float on water.

Accordingly, although great strides have been made in the area of hovercraft and drone systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional hovercraft and drone systems. Specifically, the hover drone system has increased range, energy efficiency and payload capacity over conventional hovercraft and drone systems. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 1:
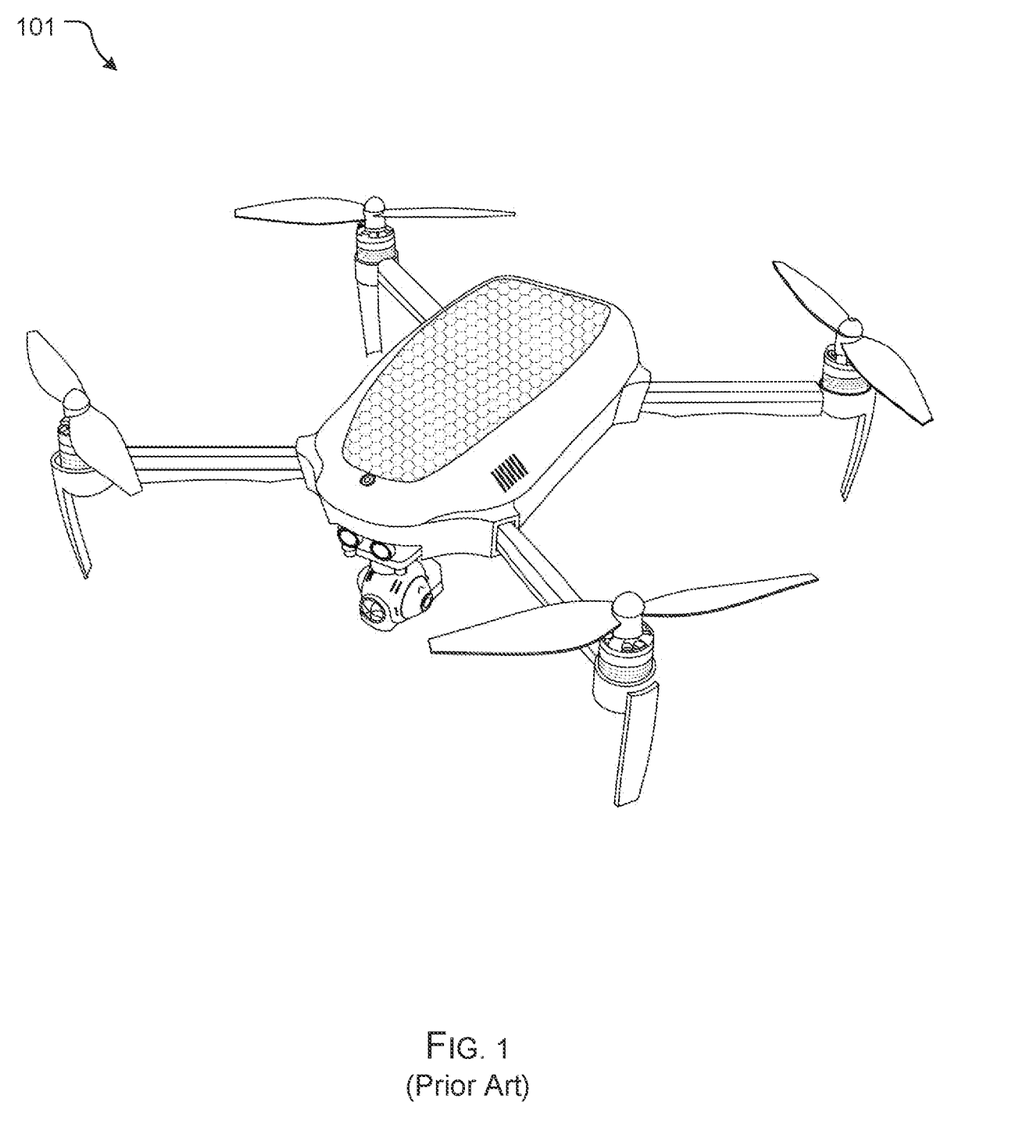
FIG. 1 is a top perspective view of a common drone system.
Figure 2:
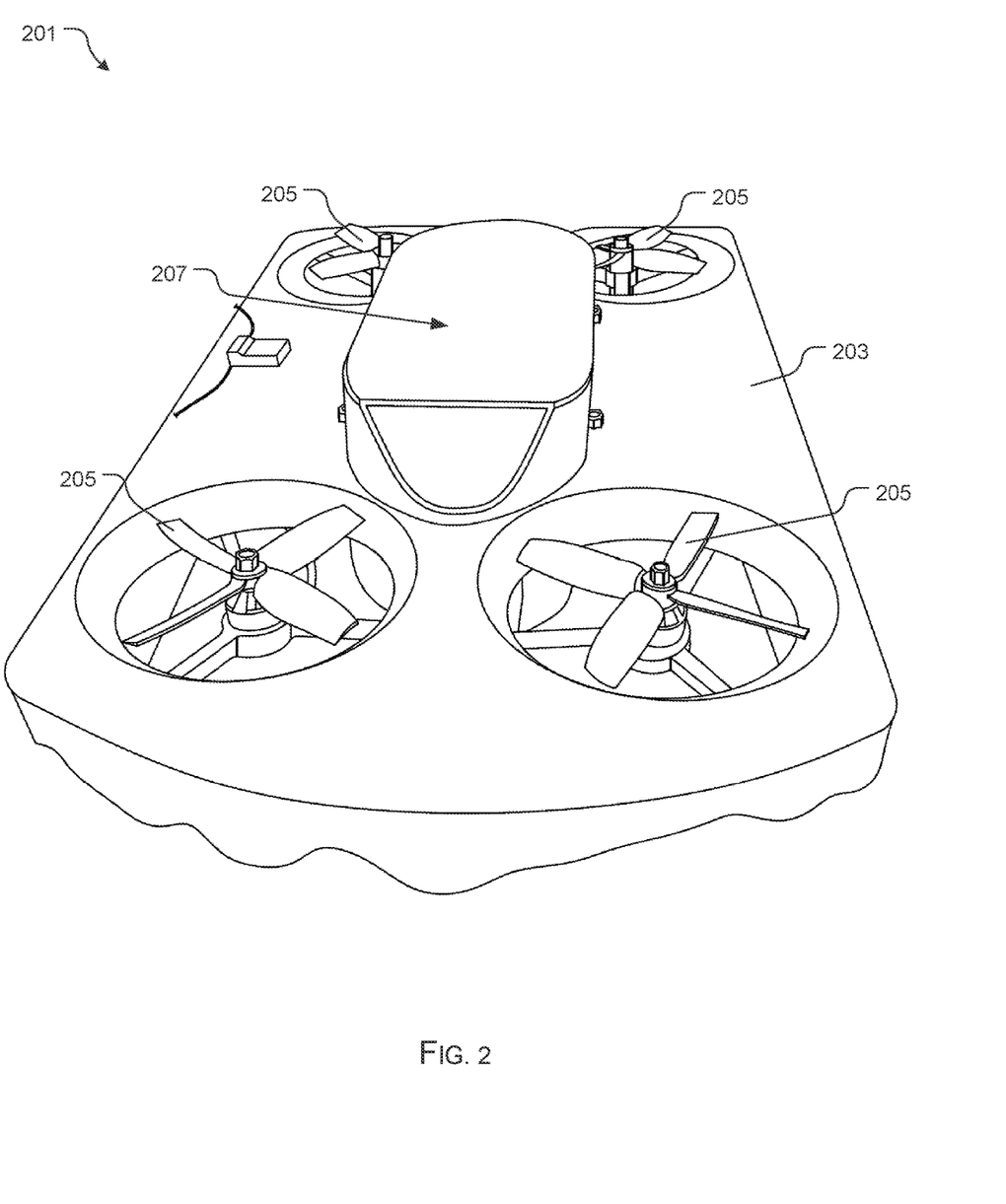
FIG. 2 is a top perspective view of a hover drone system in accordance with a preferred embodiment of the present application.
Figure 3:
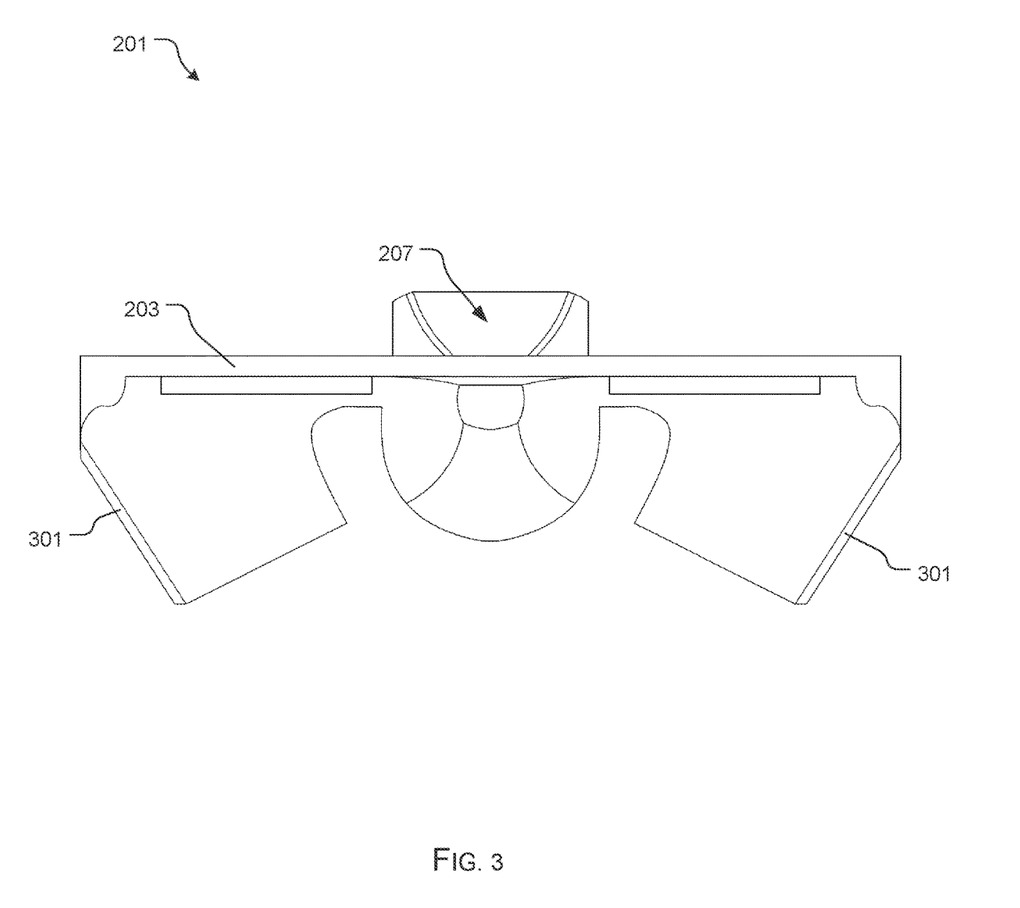
FIG. 3 is a front view of the hover drone system.
Figure 4:
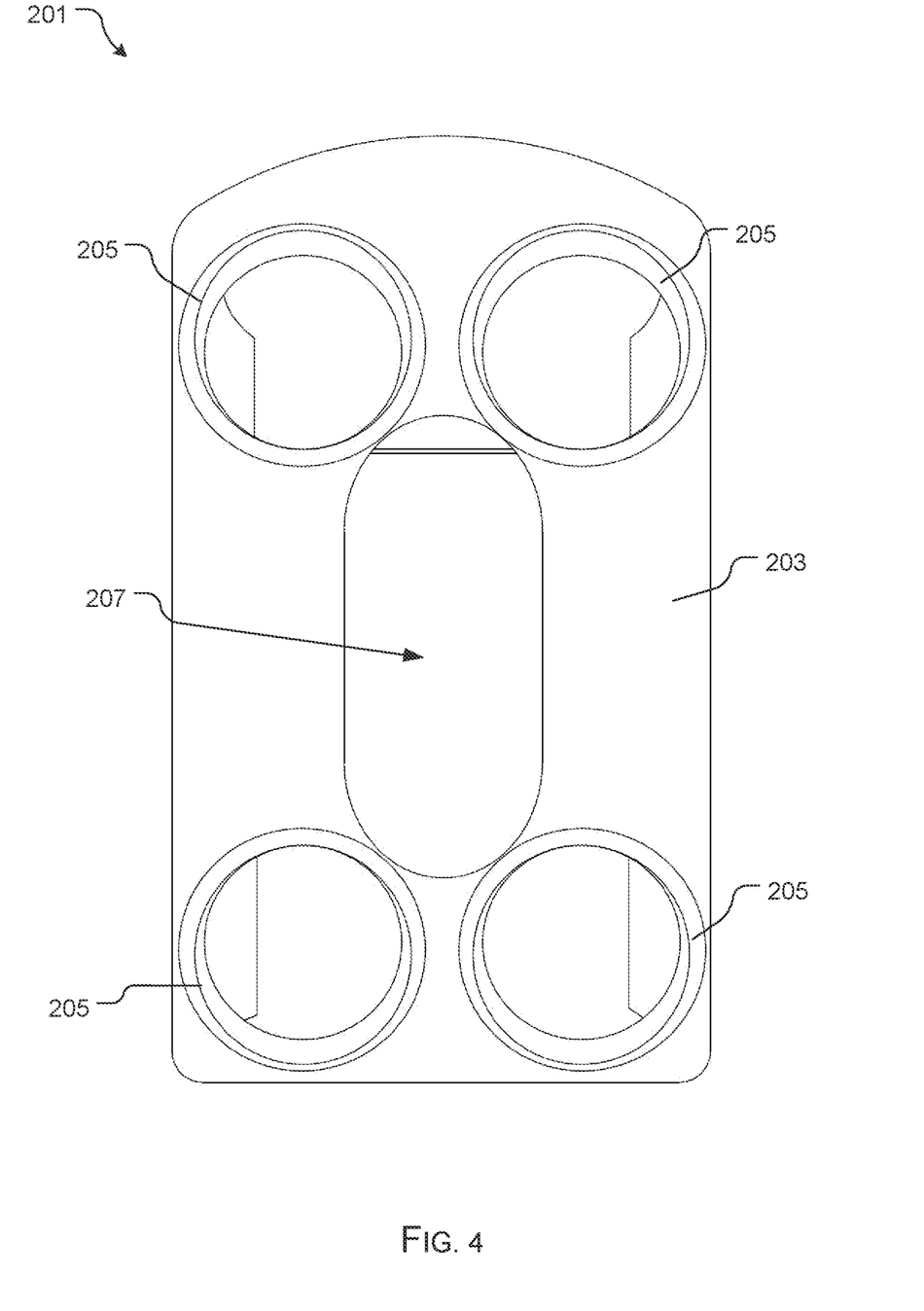
FIG. 4 is a top view of the hover drone system.
Figure 5:
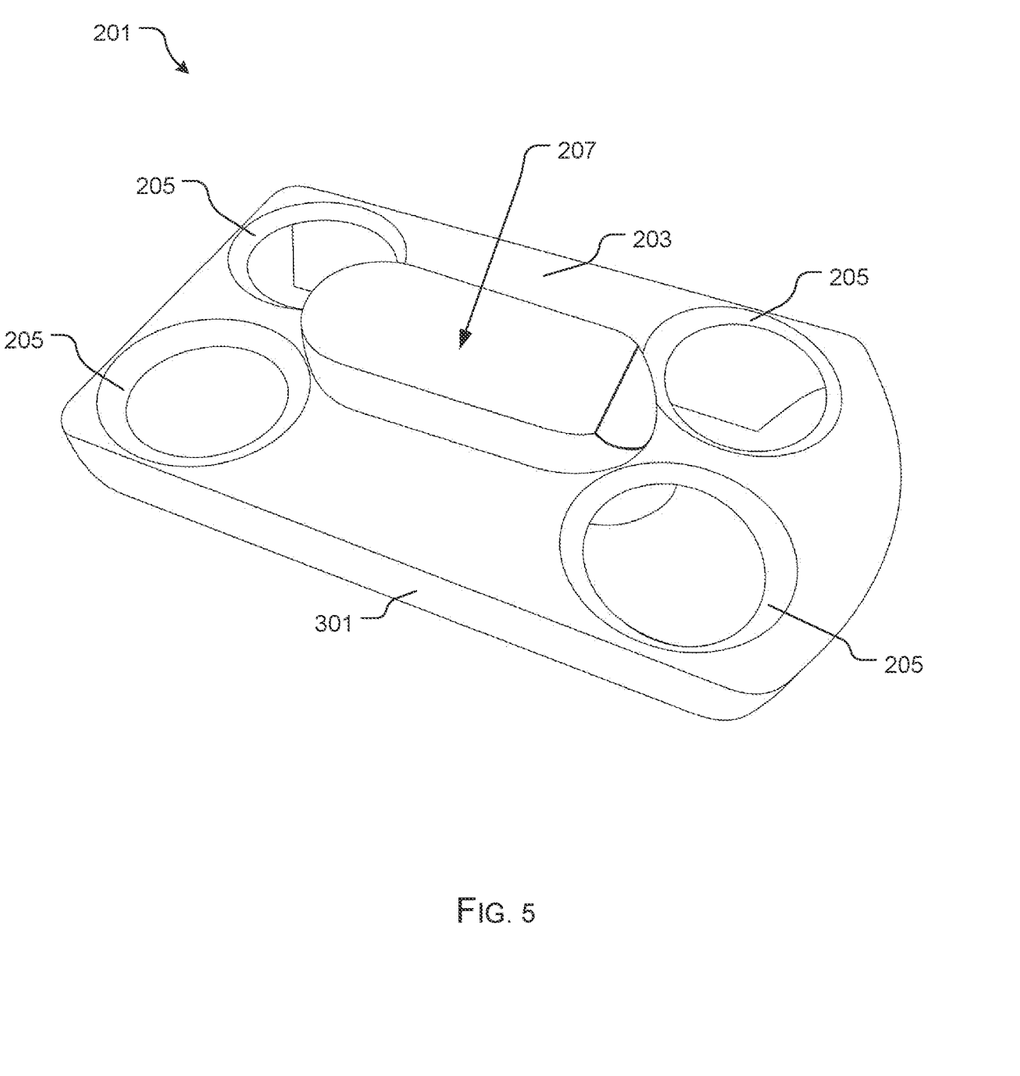
FIG. 5 is a side perspective view of the hover drone system.
Figure 6:
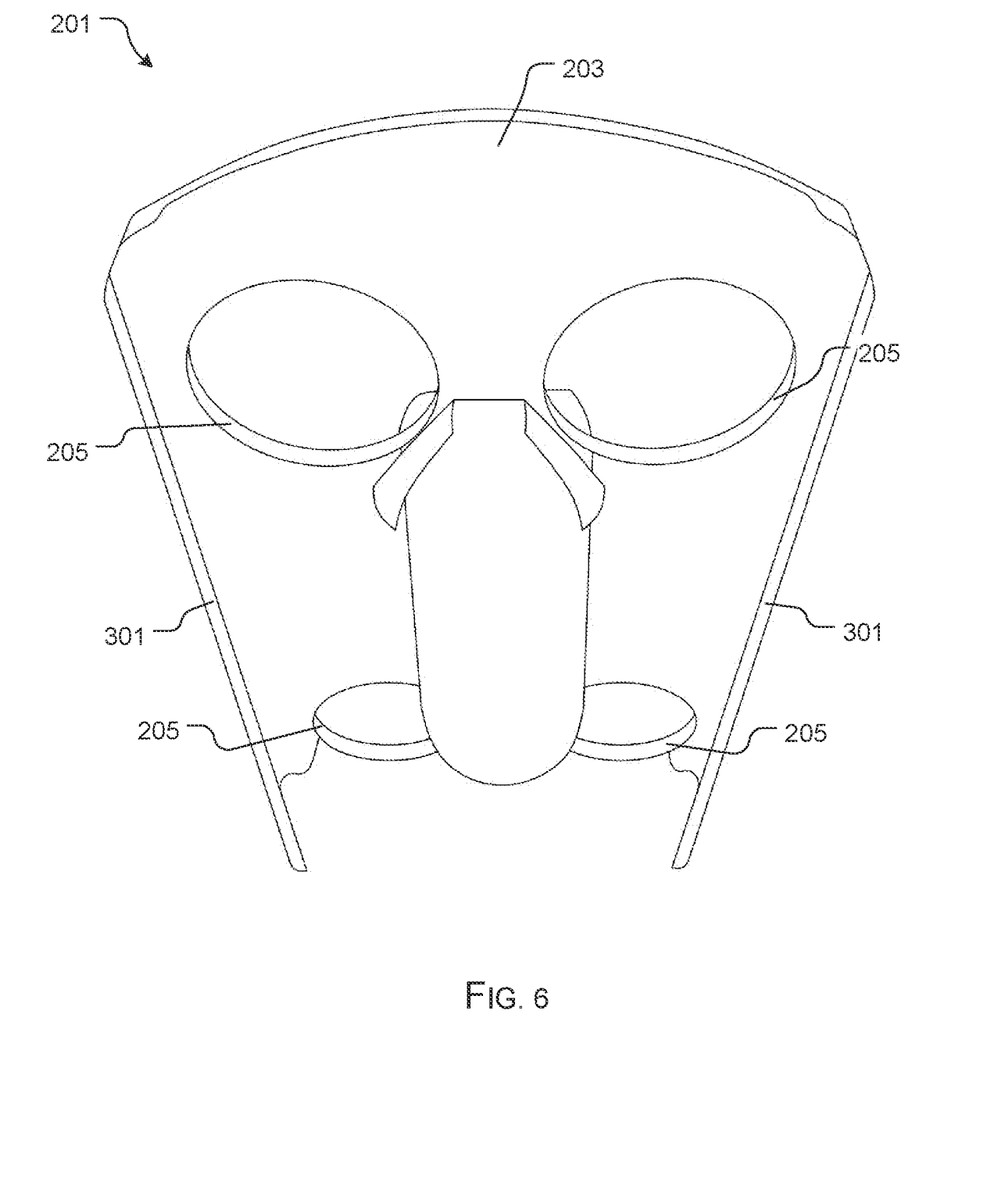
FIG. 6 is a bottom perspective view of the hover drone system.

Referring now to the drawings wherein like reference characters identify corresponding or similar elements throughout the several views, FIG. 2 depicts a top perspective view of a hover drone system in accordance with a preferred embodiment of the present application. It will be appreciated that system 201 overcomes one or more of the above-listed problems commonly associated with conventional hovercraft and drone systems.

Figure 11:
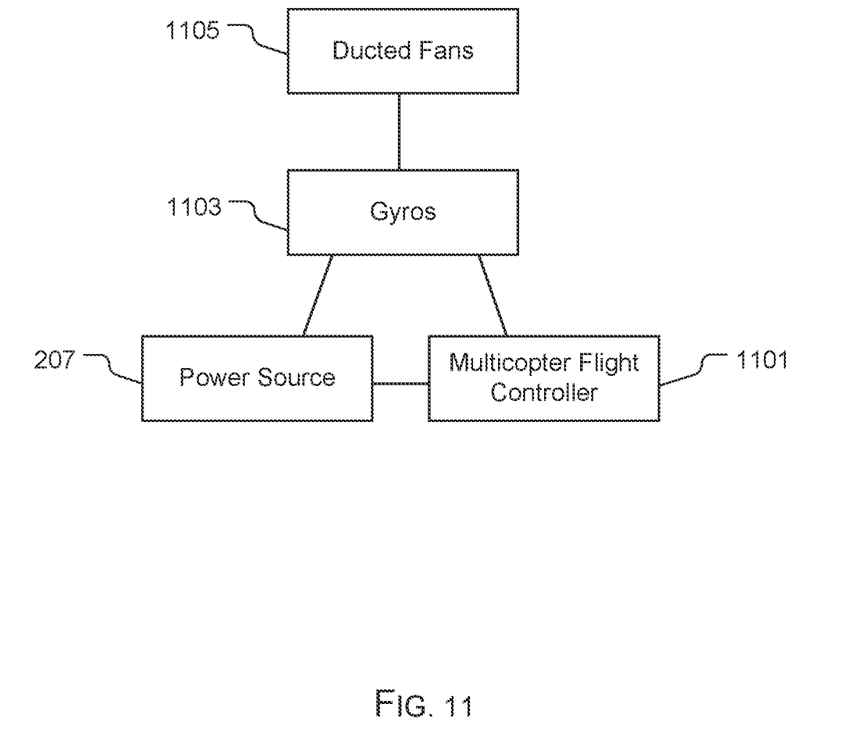
FIG. 11 is a schematic of the electronic components of the present invention.

In the contemplated embodiment, system 201 includes a hull 203, one or more skirts 301 surrounding the hull 203, a plurality of ducted fans 205 integrated into the hull 203, and a power source 207. The one or more skirts 301 may be flexible and system 201 may further include a rear exhaust for thrust. The power source 207 may be a battery such as an Li ion or hybrid combination or the like. As shown in FIG. 11, the system can utilize the power source 207 with a multicopter flight controller 1101 and one or more gyros 1103 for operation, stability, and directional control as achieved with the ducted fans 1105. The multicopter flight controller 1101 precise altitude of the Hoverdrone at all time and all modes of operation. It is an essential part of the system and what makes so easy to control in close proximity to the surface its travelling over.

System 201 has various modes of operation. System 201 may operate similar to a floating air driver boat which requires minimal power (10% of a conventional drone system). System 201 may also operate similar to a sidewall hovercraft with or without water screws and is highly efficient at medium speeds, works on land and also when air driven reducing power required to 25% of a conventional drone system. System 201 may also operate in surface effect mode similar to a WIG aircraft which allows for higher ground clearance and faster speeds over land and water and only requiring 75% power compared to a conventional drone system. System 201 may also operate in full drone mode with unlimited vertical height and full stability in 3 dimensions.

System 201 may operate with precise control on land and on water. System 201 may have rotation about its own axis, movement forward, reverse and sides. Additionally, if system 201 encounters a wall or gradient that is too high to traverse, drone mode may be used to climb allowing access to otherwise unreachable areas. The combination of hulls has a positive buoyancy when in water and therefore provides floatation.

System 201 is designed to be a versatile vehicle that outperforms conventional drone systems in terms of energy usage when traveling over mixed water and land terrain. System 201 is able to safely operate at 10% power level compared to a conventional drone system thereby increasing its range or payload significantly. System 201 also has unlimited water and land transient capability (e.g. harbor water to dockside vertical jump, topside ship into the sea and back such as a marine landing craft, ship to sea to beach to cliff top to road way, etc.).

FIGS. 3-6 depict various views of the hover drone system 201. It should be appreciated that although the various views of the hover drone system 201 depict 4 ducted fans for lift and propulsion, a greater or fewer number of ducted fans may be incorporated into the hover drone according to various use case scenarios.

It should be appreciated that one of the unique features believed characteristic of the present application is the combination of the best aspects of hovercraft systems and drone systems. System 201 is more efficient when traveling over land or water than a conventional drone system. System 201 also has flying capabilities which allow it to reach certain areas or travel over gradients that a conventional hovercraft system could not.

In FIGS. 7A through 10, an alternative embodiment of a hover drone system 701 are shown. This system can include some or all of the features discussed above, including a hull 703 with a plurality of ducted fans 705, 707, 709, 711. As shown, the fans are separated into pairs, including a front pair 705, 707 and a rear pair 709, 711. This allows for the use of the hover drone system 701 for a plurality of uses.

Figure 7A:
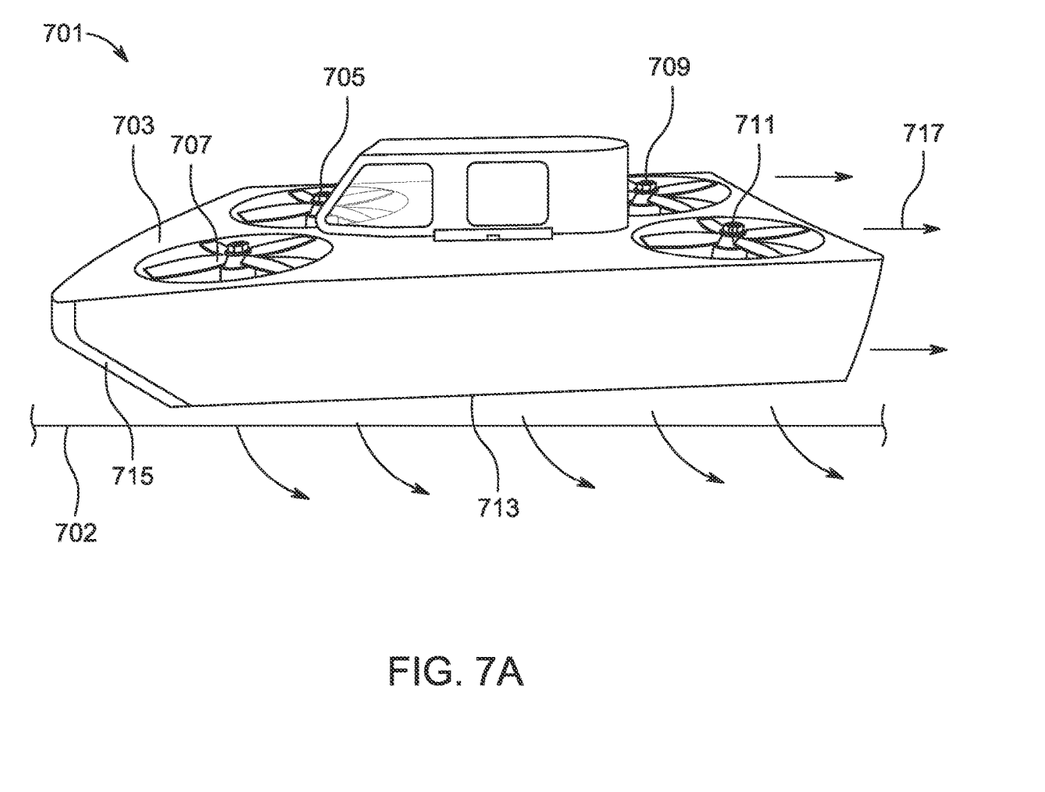
FIG. 7A is a side view of an alternative embodiment of a hover drone system in accordance with the present application shown in a hovercraft mode above a surface.
Figure 7B:
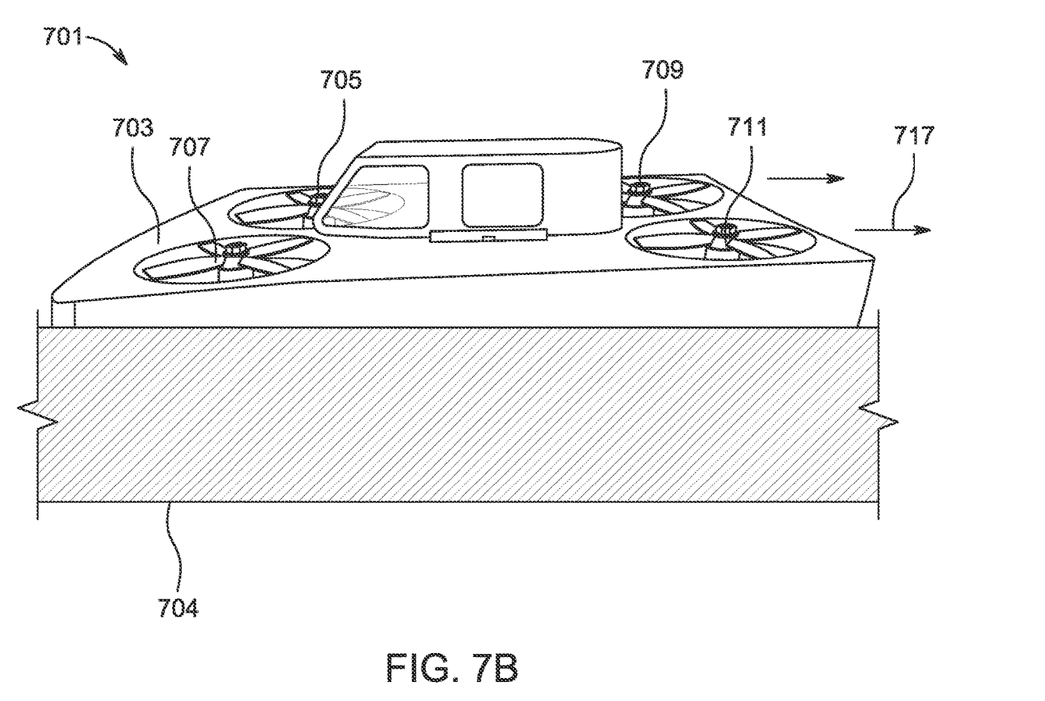
FIG. 7B is a side view of the hover drone system of FIG. 7A shown in a floating air boat mode on a water surface.
Figure 7C:
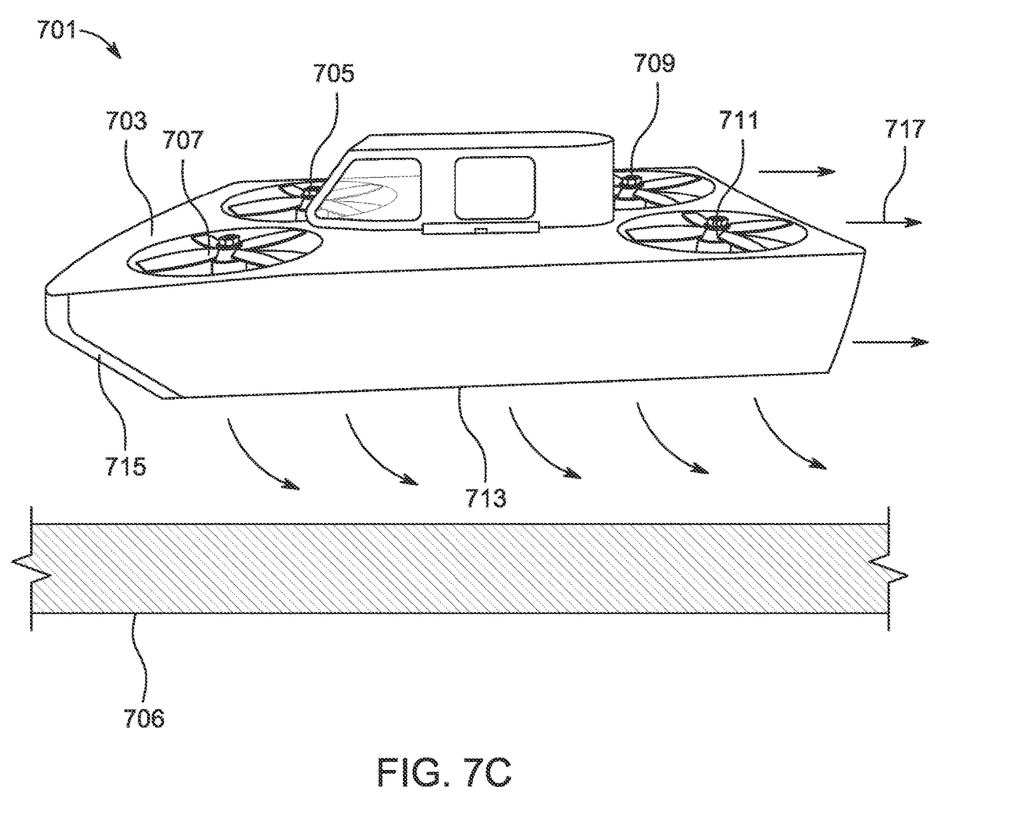
FIG. 7C is a side view of the hover drone system of FIG. 7A shown above a surface.

As shown in FIG. 7A, the hover drone system 701 can be used in a hovercraft mode above a surface 702. In FIG. 7B, the system 701 is shown in a floating air boat configuration on a water surface 704. Lastly, in FIG. 7C, the system 701 is shown above a ground surface 706.

Figure 9:
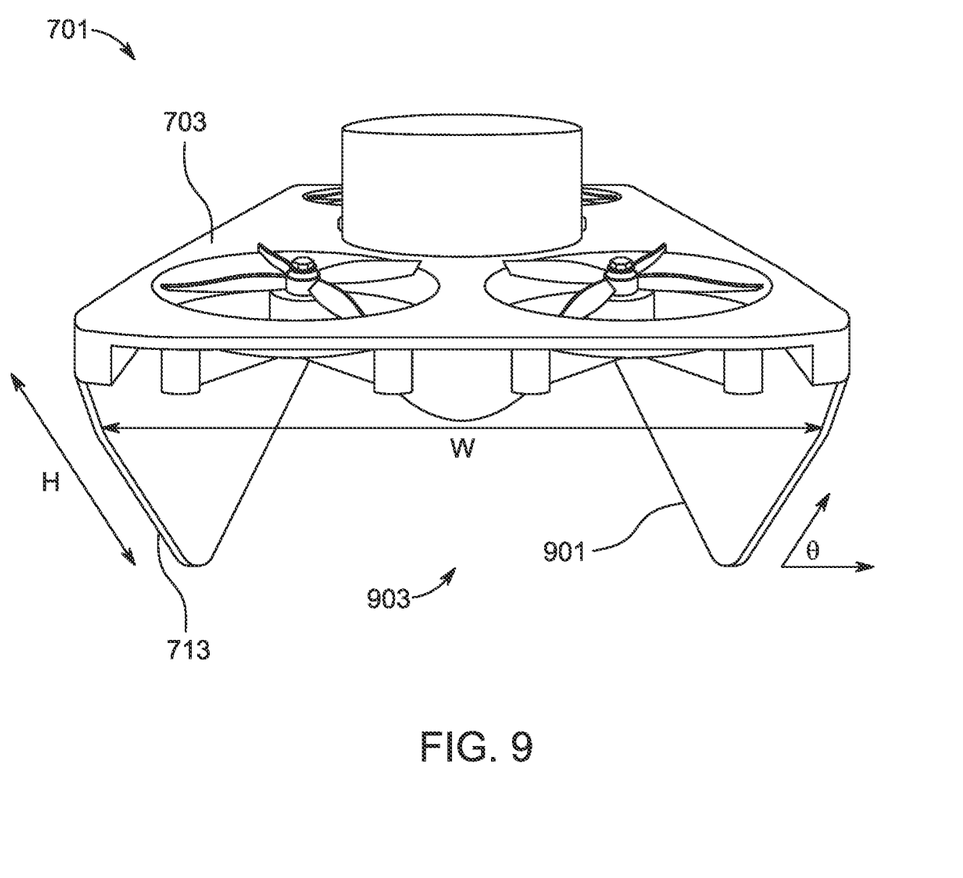
FIG. 9 is a rear view of the system of FIG. 7A.
Figure 10:
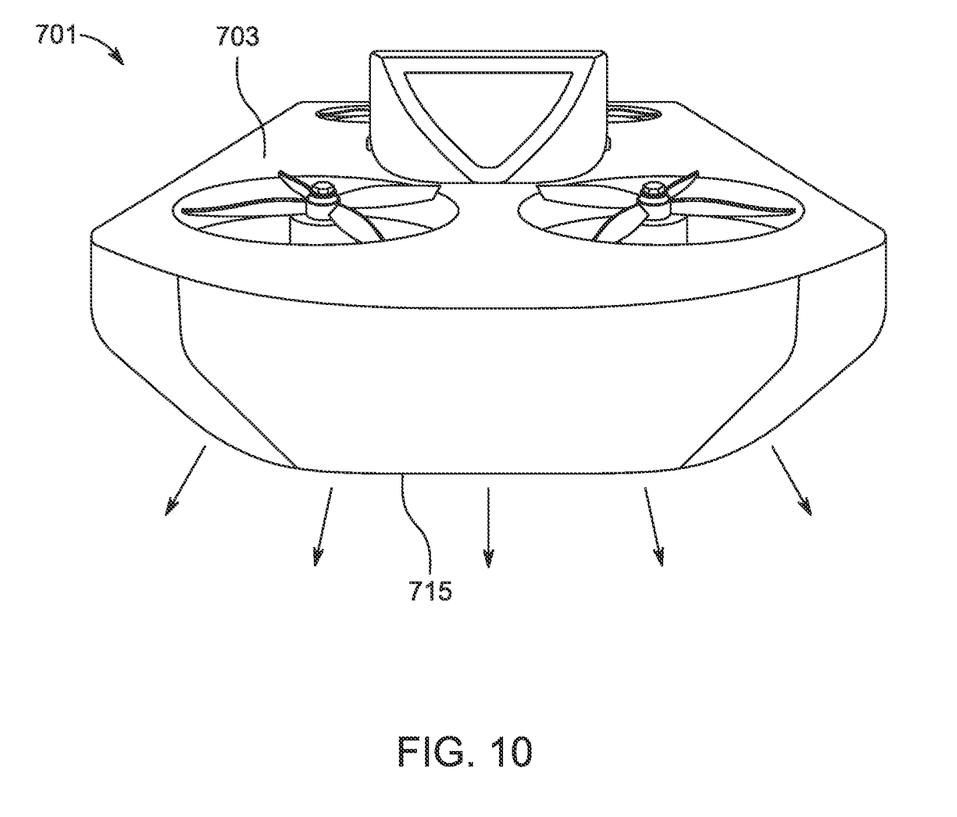
FIG. 10 is a front view of the system of FIG. 7A.

The system 701 includes rigid side walls 713, 901 and a flexible skirt 715 that extends between the sidewalls at a front of the hull 703. Further, the system includes an open rear 903 for thrust. In the preferred embodiment, the sidewalls are angled inwards by 30-45 degrees Theta. Further, the front flexible skirt is also angled inwards.

Figure 8:
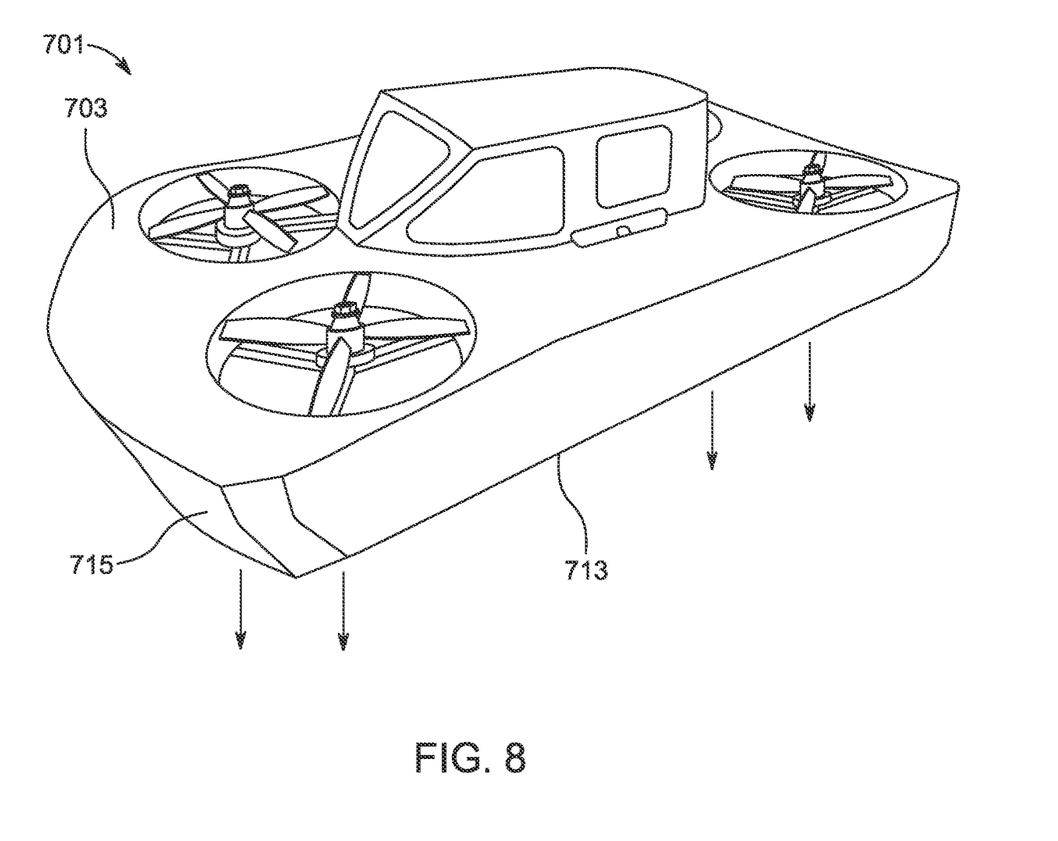
FIG. 8 is a top perspective view of the system of FIG. 7A.

As shown best in FIG. 7, the system 701 can be used in a forward motion configuration, wherein rear thrust 717 is created. As best shown in FIG. 8, the system 701 can be used in drone mode wherein there is no rear thrust.

It should be appreciated that one of the unique features believed characteristic of the present invention is the open rear. During use, the lift air is trapped on three sides by the rigid sidewalls and the flexible skirt at the front.

In some embodiments, the system is used while floating in water. In this example, the central hull acts as floatation and the two sides as stabilizers, like a trimaran, leaving a partial gap in the rear between the top of the hull and the water surface. Note there is sufficient gap between the central hull and the two sides for air to flow freely. As the four fans throttle up, the plenum fills with air and leaks out the rear of craft which produces forward motion. Rotational yaw still works with the four fans, even though the craft is not hovering at this stage. The craft will move relatively slowly, as per an airboat.

In another embodiment, the system will utilize hovercraft mode. When power is increased further there comes a point when the static pressure in the plenum is sufficient to overcome its weight and also thrusting air rear wards threw the gap now at its maximum, approximately H×W×cushion pressure. The other three sides are now clear of the water and the craft accelerates rapidly. However, this can only happen in a well-controlled manner thanks to the on board gyros and feedback loop of the flight controller. At this point the craft is free to move in all directions apart from reverse. Speed is as a high speed hovercraft.

In yet another embodiment, the system may be used above ground as opposed to water. Conventional hovercrafts have generally a hover height limit of one eighth of their width after which they become unstable, thereby limiting their ground or sea clearance. The present invention has no such limits, the hover height being stabilized by the flight controller. As we further increase the throttle we can gain sufficient height so we can safely pitch forward the craft so now have thrust from the rear plus the sine of the angle×the weight of the craft! Better still the system operates low enough to benefit from support of the ground effect on the cushion. A very fast speed or very efficient mode of operation. This mode also supports reverse! The flying of the present invention can be adjusted to the terrain conditions whether they be rough ground or high wave height.

Lastly, another use of the present invention is in full drone mode. If the system is throttled up even more, the thrust of the four fans will overcome the weight of the craft and become clear of the surface entirely. It will lose its forward thrust from the rear as the air is no longer deflected by that surface and instead flows down wards as per normal drone operation. The flight controller has control in all axis: pitch, roll, yaw, sideways, up, down, forward, backwards.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A hover drone system, comprising:
   a hull extending from a front end to a rear end and from a first side to a second side, the hull is rigid and gradually tapers inwardly in width from the rear end to the front end, the rear end forming an opening;
   a multi-copter flight controller configured to provide precise altitude of the hover drone system;
   a plurality of ducted fans integrated into the hull, wherein the plurality of ducted fans provides lift and propulsion for the hover drone system, the plurality of ducted fans operated by a power source and one or more gyros;
   a first sidewall extending from the first side of the hull;
   a second sidewall extending from the second side of the hull; and
   a flexible skirt extending from the front end of the hull and from the first sidewall to the second sidewall;
   wherein the first sidewall and the second sidewall are oriented at an angle relative to each other; and
   wherein the plurality of ducted fans creates a downwash of air that in turn is partially directed to the opening via the tapering of the hull.

* * * * *